United States Patent [19]

Miller

[11] Patent Number: 5,608,471

[45] Date of Patent: Mar. 4, 1997

[54] SOFT, BIFOCAL CONTACT LENS

[75] Inventor: Troy A. Miller, Grand Junction, Colo.

[73] Assignee: Westcon Contact Lens Co., Inc., Grand Junction, Colo.

[21] Appl. No.: 497,846

[22] Filed: Jul. 3, 1995

[51] Int. Cl.$^6$ .................................................. G02C 7/04
[52] U.S. Cl. .................... 351/161; 351/160 H; 351/176
[58] Field of Search ................................ 351/161, 160 R, 351/160 H, 169, 174, 176

[56] References Cited

U.S. PATENT DOCUMENTS

| | | | |
|---|---|---|---|
| 4,042,552 | 8/1977 | Grucza | 260/29.6 RB |
| 4,084,890 | 4/1978 | Baron | 351/160 |
| 4,126,138 | 11/1978 | Isen | 351/160 |
| 4,165,158 | 8/1979 | Travnicek | 351/160 |
| 4,463,148 | 7/1984 | Höfer et al. | 526/264 |
| 4,636,049 | 1/1987 | Blaker | 351/161 |
| 4,752,123 | 6/1988 | Blaker | 351/161 |
| 4,861,152 | 8/1989 | Vinzia et al. | 351/161 |
| 4,869,587 | 9/1989 | Breger | 351/161 |
| 4,892,402 | 1/1990 | Sawamoto et al. | 351/160 H |
| 5,071,244 | 12/1991 | Ross | 351/161 |
| 5,085,013 | 2/1992 | Ascosi et al. | 51/277 |
| 5,125,729 | 6/1992 | Mercure | 351/161 |
| 5,141,301 | 8/1992 | Morstad | 351/161 |
| 5,191,365 | 3/1993 | Stoyan | 351/160 R |
| 5,422,687 | 6/1995 | Tanaka et al. | 351/161 |

FOREIGN PATENT DOCUMENTS 2688898  9/1993  France.

*Primary Examiner*—Scott J. Sugarman
*Assistant Examiner*—Jordan M. Schwartz
*Attorney, Agent, or Firm*—Dorr, Carson, Sloan & Birney, P.C.

[57] ABSTRACT

A soft contact lens having the ability to make bifocal corrections can be made by the conjunctive use of lens elements comprising: an annular main body portion having a concave, eye-contacting, posterior surface and a non-continuous, convex, anterior surface having a near vision-aiding add zone, a transition zone, a far vision-aiding zone and a slab-off system and wherein: (a) the near vision-aiding add zone has a diameter of from about 1.5 mm to about 3.5, (b) the transition zone has a base length of from about 0.03 mm to about 0.20 and (c) a slope angle of from about 15° to about 40°. Such lenses also can be used to correct astigmatisms by providing their posterior surface with a toric optic zone.

6 Claims, 2 Drawing Sheets

SOFT, BIFOCAL CONTACT LENS

BACKGROUND OF THE INVENTION

Ideally a human eye lens receives light from an object and bends it in such a way that an image of the object is resolved upon the photoreceptor cells at a small area of the retina called the macula. The retina is the nerve fiber layer in the interior of the eye, with the macula being the most sensitive area of the retina receiving visual images. In order to maintain focus on the macula, the eye's lens must change its shape when objects are viewed from near distances. The human cornea also serves to focus incoming light. The cornea has more focusing power than the lens. In any case, if the cornea-lens combination focuses light rays from a viewed object at a point in front of the retina, the person is thereby rendered myopic, also commonly called nearsighted. In effect, the image projected onto the photoreceptor cells of the macula on the retina appears blurred and out of focus. Myopia often occurs when the eyeball grows too long for the normal focus of the cornea and the lens. An eye of normal size also can develop myopia if the curvature of the cornea and/or lens increases, thereby producing greater refractive power (bending of light).

A myopic person's distance vision is blurred, but that person has good near vision until reaching the age of between 40–45 years, when presbyopia becomes a factor due to the hardening of the lens inside the eye. This condition can usually be corrected by the use of glasses or contact lenses having a convex front surface and a concave back surface with a smaller radius.

Conversely, if light rays from a viewed object are focused at a point behind the retina, the person is thereby rendered hyperopic or farsighted. This defect in the refraction of light coming into the eye diminishes the person's ability to see objects at varied distances. In hyperopic patients, rays of light coming from distant objects are not properly focused on the retina and those coming from nearer objects (say, within 20 feet) also are out of focus. The physical causes of farsightedness may be (1) too short an eyeball, (2) insufficient convexity of the eye's lens and/or (3) changes in the refractive media of the eye. In most cases farsightedness is correctable by the use of glasses or contact lenses having suitable convex lens systems.

Next it should be noted that the pupil of the eye acts as the limiting aperture through which all light from an object being viewed must pass. Thus, for any given pupil size, the size of the pupil aperture will determine the relative contribution of light from near objects.

In addition to the eye conditions of hyperopia and myopia, when a person reaches 40–45 years of age he or she also becomes presbyopic, i.e., unable to focus clearly on objects at near ranges regardless of whether the patient is hyperopic or myopic or ametropic (without a defect). This condition can be corrected by bifocals or reading glasses or multi-focal (bifocal) contact lenses.

The term "astigmatism" is applied to a condition wherein light rays emanating from a viewed object are not focused as a single point by the eye's optical system, but rather are focused (usually at right angles to each other) as two line images at different distances along an optical axis of the eye. Astigmatism usually has its genesis in irregularities in the shape of the cornea. For example, a cornea may not be truly spherical; it may be slightly flattened or contain a bulge, either horizontally or vertically. Astigmatism is manifested by a variety of vision distortions. For example, in looking at an object, a straight line in the vicinity of that object may appear curved to a person suffering from some forms of astigmatism. Another manifestation might be that, when the eyes are moved, a motionless object may seem to move as it passes through the field of vision of an astigmatically distorted area of an eye. Astigmatism can be horizontal, vertical, or diagonal.

In general, artificial correction of the above-noted vision problems by use of contact lenses follows from the fact that precise changes in their refracting power can be created through the use of differences in the radii of curvature of the opposing surfaces of such a lens. For example, when the radius of curvature of the outer surface of a contact lens is greater than the surface next to the eye, or the back surface, the lens provides plus refractive power. Conversely, when the radius of curvature of the outer surface of the optical portion is less than the radius of curvature of the inner surface, minus refracting power is obtained. "Plano" power is obtained when the two radii are equal. Hence, aside from changes in the chemical compounds from which contact lenses, and especially soft contact lenses, are made, most innovative steps concerning contact lenses involve changes in the geometry of the elements of such lenses in order to: (1) improve vision, (2) maintain the angular orientation of the lens with respect to the eye and/or (3) move the lens up or down through action of the eyelid.

It also should be noted that, because the role played by the brain in processing light—carried information (i.e., reducing it to "vision") is not completely understood, the efficacy of such changes in vision are based upon experience as well as upon application of the principles of optics. That is to say that, "seeing" and "vision" are highly complex phenomena that involve the eye (as the organ of seeing) as well as the brain (the organ of vision). And, as with any function involving the brain, these phenomena are subject to the influences of many variables. For example, since near and distant focal planes are focused on the retina simultaneously, the observer's brain must, in effect, "select" the desired image and suppress the unwanted image. Such suppression and selection of images has been well documented, but it is not well understood. Some psychometric studies have strongly suggested that a person will see an object in spite of visual "noise" (light that does not contribute to the image of the object of regard) by virtue of the brain's ability to "ignore" the unselected images. Such studies also have suggested that the direction of a person's gaze and the location of the desired object also are factors in the brain's processing of light-carried information. It also has been established that "unselected" images, and especially those that lie peripheral to the line of sight, are somehow less effective in stimulating the brain's photoreceptor cells. The ability of artificial lenses to influence the brain's processing of photoreceptor-induced electrical stimuli of near and distant images also has been well established, but not fully understood. Indeed, the multifocal soft, contact lenses of this patent disclosure, in ways that are not completely understood, make use of the brain's own ability to process light-carried information in desired ways.

Some elaboration of this important effect is in order. Conventional bifocal spectacles, and rigid bifocal contact lenses, have called for the user to somehow position the near vision lenses to view the near object of regard. A different segment of the lens would be used to see more distant objects; this might be accomplished by the user's moving the lenses slightly with an eyelid, or the spectacle wearer's tilting his head downward to view through the upper portion of his glasses. This effect is known as "translation." By contrast, applicant's design calls for the user to look through the near vision and far vision portions of the lens simultaneously at all times. Near and far vision are both constantly available for selection or rejection by the user's brain, with no adjustment of the lenses or eyes or head to the object being viewed.

The lens design features used by applicant to achieve these results are, to some degree, loosely scattered throughout the patent literature. For example, U.S. Pat. No. 4,126,138 teaches a soft contact lens having a carrier portion and a central optical portion wherein the radius of curvature of the outer surface of the optical portion is described as being greater than, or less than, the curvature of the eye contacting inner surface. Thus, the lens can provide either far vision correction or near vision correction. Variation in the refractory power of this lens is described in terms of the height of an optical portion of the outer surface of the lens above the height of its carrier portion-relative to the height of the optical portion. A sloping interconnect portion of this lens system is generally described as "either a flat or slightly outwardly or inwardly curved surface". The slope of the interconnect portion also is described as being determined by the values of certain dimensions of various elements of the lens.

U.S. Pat. No. 4,752,123 discloses a bifocal contact lens with three distinct concentric zones. The first is a centrally positioned, far-vision correction zone of circular periphery. Preferably this zone has a diameter of from about 0.5 to 1.5 mm. This far-vision correction zone is surrounded by a near vision correction zone having a diameter of about 2.35 mm. A third, outer vision-aiding zone, having an outer diameter of 7.00 mm, surrounds the near vision correction zone.

U.S. Pat. No. 4,869,587 teaches a contact lens having two concentric annular areas. In one embodiment of this lens, an annular central area provides near vision correction. An outer annulus surrounds the central area and is configured to provide distant vision correction. Moreover, these two zones can be arranged to accommodate an intermediate annular area for making intermediate corrections. This patent also discloses use of a small peripheral curve for fitting the lens to the eye.

U.S. Pat. No. 4,636,049 discloses a contact lens having two distinct vision correction regions. They are formed by use of two different curves on the front surface of the lens. A first, centered, zone is characterized as "a near power correction region". It is surrounded by a concentric, distance correction zone. The near power correction zone also is described as having a rear surface area equal to about one half of the pupil area of a normal eye under normal reading light conditions.

U.S. Pat. No. 5,141,301 discloses a soft toric contact lens having a distance-vision correction portion and a near-vision correction portion. The near-vision portion is located in the upper and side regions of the optical zone. The circular design is of equal reading segment size all around the distance-vision correction portion. The lens also is thicker near its upper edge. Hence, as the upper eyelid moves down, it pushes the lens downward.

U.S. Pat. No. 4,084,890 discloses a soft contact lens having a centrally located optical zone surrounded by a peripheral portion that extends outwardly from the optical zone to a relatively thin outer edge zone. The outer edge zone is thicker than either the edge or the juncture of the optical zone. It also is thicker than the peripheral portion.

U.S. Pat. No. 5,071,244 teaches a soft contact lens system having a central portion formed to the distance correction prescription of the user and a small auxiliary lens formed to the close up prescription of the user. The auxiliary lens is located on the lower margin of the lens.

French Patent 2,688,898 discloses a lens whose anterior surface has a thicker add portion having a diameter of 1 to 3 mm and a thickness between $2 \times 10^{-3}$ and 0.05 mm. The sides of the add portion are characterized as being in the shape of a "truncated cone". No precise description of the angle of decline of this truncated cone is given.

All of these innovations notwithstanding, there still is room for making improvements in soft contact lens. This is true both with respect to the ability of such a lens to correct for presbyopia as well as maintaining its proper position on the cornea for long periods of time. There is even more room for improvement in giving soft, bifocal contact lenses that are used for correcting presbyopia, the added capability of correcting for astigmatism and maintaining the lens in the proper angular orientation with respect to the astigmatism. The soft, bifocal, contact lenses of this patent disclosure provide such improvements.

SUMMARY OF THE INVENTION

The hereindescribed invention provides soft, bifocal, contact lenses having both enhanced vision correction and eye/lens angular orientation maintenance capabilities. An individual lens made according to the teachings of this patent disclosure will be comprised of an annular main body portion having a virtually continuous, concave, eye-contacting, posterior surface and a non-continuous, generally convex, anterior surface. The anterior surface has a near vision-aiding "add zone", a transition zone (making a discontinuous transition from the add zone to a far vision-aiding zone), a far vision-aiding zone and a slab-off system that is, most preferably, a two slab-off zone system and wherein: (a) the near vision-aiding add zone has a diameter of from about 1.5 mm to about 3.5 mm, (b) the transition zone has a base length of from about 0.03 mm to about 0.20 mm and (c) the transition zone has a slope angle from the top of the add zone to the far vision-aiding zone of from 15° to about 40°.

Applicant has found that the increased ability of the hereindescribed soft contact lenses to make bifocal vision corrections is a function of both the geometry of the elements that make up the hereindescribed lenses and the relative dimensions of those elements. When employed according to the teachings of this patent disclosure, applicant's soft contact lenses are particularly useful in making corrections of visual acuity in presbyopic persons who are myopic or hyperopic. Moreover, the vision corrections achieved by these lenses can be maintained for long periods through use of the hereinafterdescribed slab-off zone system, and especially a hereinafterdescribed "double slab-off" flange ballast system.

A further embodiment of the soft, bifocal contact lenses of this patent disclosure takes the further step of providing the posterior surface of such lenses with a "cylinder" or "toric" cut of prescribed angular orientation. This is usually done to correct for astigmatism. The terms "toric" or "cylinder", as used in this patent disclosure, refer to the shape of a hollow or concave region in the posterior surface of such a lens. Generally speaking, these regions are cut, in ways known to the art, such that they have two primary meridians of refractive power. For example, as shown in FIG. 3, one primary meridian (e.g., Y-Y') may be of maximum curvature and the other (e.g., X-X') of minimum curvature. These two meridians usually are at right angles to each other and their optic effects combine to produce an astigmatic image of a point source of light. Consequently, a "toric" lens embodiment of this invention can be fabricated to have the proper power in each meridian corresponding to the meridians of ametropia in the user's eye. Consequently, the soft, bifocal, contact lens having such a toric optic zone will simultaneously provide bifocal correction for presbyopia and for astigmatism. This ability has been an elusive goal in the soft contact lens art.

The lenses of this patent disclosure are, most preferably, provided with some feature to ensure both vertical and rotational alignment of such a lens with respect to the eye. Applicant has found that this alignment is most preferably accomplished in the hereindescribed lenses by provision of two "slab-off" areas in the periphery of the front (anterior) surface of a lens—the surface of the lens that interacts with the eyelid. Such slab-off areas are, most preferably, made by thinning both an inferior region and a superior region of the front surface of the lens, in areas located outside of the far vision-aiding zone. Representative positionings of such slab-off zones are shown in FIGS. 1 and 3.

It also should be noted that the main influence on the angular orientation of a soft contact lens comes from torsional forces created by the eyelid during blinking. That is to say that, when placed on the eye, a contact lens is rotated by the force of the eyelids squeezing the thicker central portions of the lens to a position between the upper and lower eyelids. These central areas will be approximately horizontal, but the exact location is determined by the shape of the lids and the direction of the torquing forces exerted on the lens during a given blink. The eye care practitioner may need to make adjustments to the rotational axis of the power meridians of such a lens with respect to the axis of double slab-off areas for a specific patient in order to maintain proper eye/lens alignment.

DETAILED DESCRIPTION OF THE INVENTION

The functioning of each embodiment of the soft, bifocal lens systems of this patent disclosure can be better understood by considering the function of the bifocal-producing elements (the center add zone, the transition zone and the surrounding far vision aiding zone) of such lenses separate and apart from each other—and separate and apart from the function of the toric optic zone when it is employed in said lenses. Such an analysis can begin by first noting the geometry and relative dimensions of the bifocal-producing elements (the center add zone, the transition zone and the surrounding far vision-aiding zone) of the hereindescribed lenses.

Figure 1:
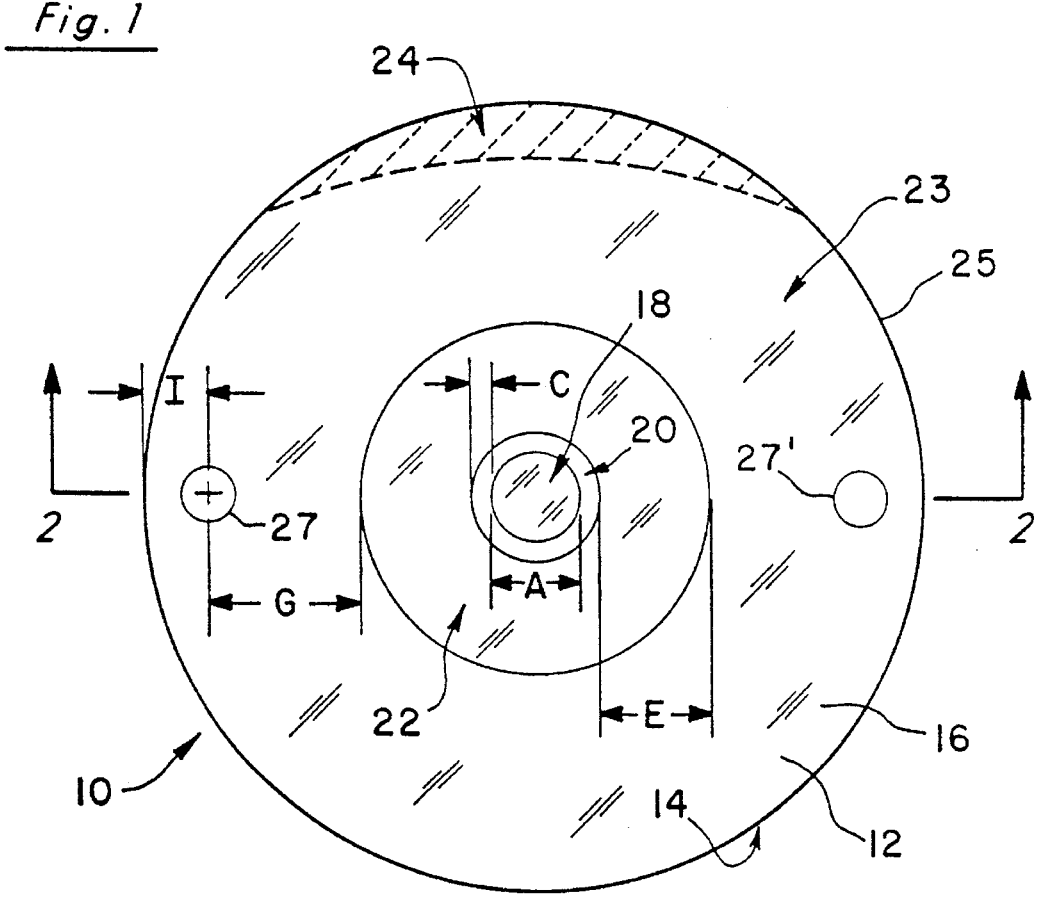
FIG. 1 is a top plan view of an embodiment of a soft contact lens constructed in accordance with the teachings of the present invention.

To this end, FIG. 1 depicts a top plan view of a bifocal, soft contact lens 10 made according to the teachings of this patent disclosure. The lens 10 has an annularly-configured, disk-like, main body portion 12 having a series of concentric annular zones. As is better seen in FIG. 2, the main body portion 12 depicted in FIG. 1 has a virtually continuous, concave, eye-contacting, posterior surface 14 and a non-continuous, convex anterior surface 16. The central region of the convex anterior surface 16 has a raised, plateau-like, near vision-aiding, add zone 18 that is surrounded by an annular, transition zone 20. The transition zone 20 is, in turn, surrounded by an annular, far vision-aiding zone 22. The far vision-aiding zone 22 is in turn encircled by an annularly-configured periphery zone 23. The primary function of periphery zone 23 is to give body to that region of the lens—as opposed to carrying out a vision correction function.

The perimeter 25 of the anterior surface 16 also is provided with "slab-off" zones. Most preferably two opposing slab-off zones will be employed. They may have a crescent-shaped configuration such as that of slab-off zone 24 shown in FIG. 1. FIG. 1 also depicts the location of two dots 27 and 27' that are used to provide a constant reference plane from which various machining operations used to make such lenses are referenced. These lenses can be made in various ways well known to the soft contact lens-making art. The manufacturing methods described in U.S. Pat. No. 5,085,013 are, however, particularly appropriate to the manufacture of the hereindescribed lenses and the teachings of that patent are incorporated into this patent disclosure.

Figure 2:
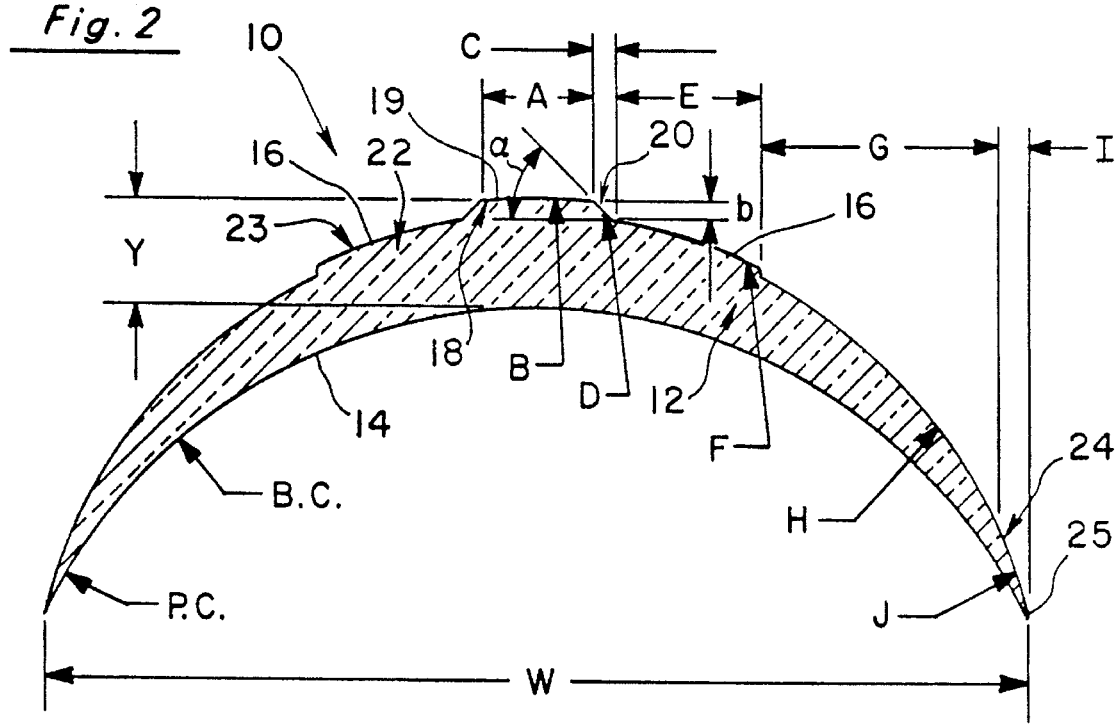
FIG. 2 is a cross-sectional view of the lens as seen along section line A—A of FIG. 1.

FIG. 2 depicts a cross-sectional view of the lens 10 along section line A—A of FIG. 1. When seen in cross section, the annular, main body portion 12 of lens 10 has a generally crescent-shaped configuration. The posterior surface 14 of the lens 10 has a continuous curved surface having a base curve as indicated by the notation "B.C." in FIG. 2. However, in some of the more preferred embodiments of this invention, the posterior surface also may be provided with a slightly different peripheral curvature designated "P.C." in FIG. 2, near the lens periphery 25, that is not continuous with curve B.C. Hence applicant has described this posterior surface in some parts of this patent disclosure as being "virtually" continuous.

The anterior side 16 of lens 10 has several distinct regions on its generally convex, but non-continuous surface. The first of these distinct regions is a near vision-aiding, add zone 18 having a plateau-like surface 19. It also should be noted in passing that the plateau-like surface 19 of the near vision-aiding zone 18 appears to be flat in FIG. 2, but this surface may in fact have either a concave or a convex front surface. Such a curvature is generally denoted by use of curvature arrow "B" in FIG. 2. In either case, however, this plateau-like surface 19 is built up upon the summit of the generally curved anterior surface of the lens 10. The diameter of this plateau-like surface 19 is depicted by dimension A in FIG. 2. Applicant has found that this dimension A must be relatively small, i.e., from about 1.5 mm to about 3.5 mm, in order for this surface to serve as the near-vision adding zone of applicant's bifocal, contact lens system.

For example, applicant has found that when the diameter of the add zone 18 is less than about 1.5 mm or greater than about 3.5 mm the user experiences a halo, or double vision, effect. Moreover, when the add zone diameter is greater than about 3.5 mm, the user does not get adequate distance vision correction. That is to say that, when the 3.5 mm limit is exceeded, the near vision information dominates the user's vision to the detriment of the distance vision. In other words, under the conditions produced by a lens otherwise made according to the teachings of this patent disclosure, but having an add zone having a diameter greater than about 3.5 mm, the images from the two focal planes produced by the near vision-aiding zone 18 and the far vision aiding zone 22 overlap on the retina. The near vision-aiding zone 18 will produce an image with more flux density and will stimulate the retina's photoreceptors the most and, consequently, will be perceived by the brain as being more distinct. The relative contributions from these two zones also may be related to the amount of light each captures and focuses on the retina.

The far vision-aiding zone 22 of lens 10 has a much larger size than the add zone 18 and a much more pronounced curvature over its surface 23. Preferably the far vision-aiding annular zone 22 will have a horizontal width (depicted by dimension E in FIG. 2) from about 2.33 mm to about 3.33 mm. The far vision-aiding zone 22 annularly encircles transition zone 20, that, in turn, annularly encircles add zone 18. Far vision-aiding zone E also has its own radius of curvature as indicated by curvature arrow F. The far vision-aiding zone E is, in turn, surrounded by an annular, peripheral, curved zone G that preferably has its own radius of curvature H. However, the function of peripheral curved zone G is more to impart mechanical strength, by giving "body" or edge thickness to the peripheral regions of the lens 10, rather than to make corrections in the lens user's vision. It also should be noted that the centers of the manufacturing aid marks 27 and 27' are depicted as being located a distance I from the outer edge 25 of the lens 10.

Applicant's experimental work and clinical studies have established that some of the most important features of the hereindescribed lenses are: (1) the dimension of the diameter "A" of the plateau-like, near vision-aiding add zone 18, (2) the dimension of the width "C" of the transition zone 20 connecting the top of the add zone 18 to the top of the far vision-aiding zone 22 and (3) the slope angle ∝ of the surface 20 of the transition zone 20. For example, applicant found that if the angle ∝ (see FIG. 2) of the transition zone 20, between the surface 19 of the plateau-like add zone 18 and the surface 23 adjoining the far vision-aiding zone 22, is less than 15°, the surfaces of the plateau and the far vision aiding zone will blend together in a nearly continuous curve and will not appear as being "distinct" from each other: consequently, the user of such a lens will experience "double vision," possibly due to the brain's inability to select between light stimulus received from a distinct near vision zone and that received from a distinct far vision zone. On the other hand, if the angle ∝ of the transition zone 20 is greater than about 40°, the user will experience halos and/or rainbows in his or her vision.

Applicant also has found that the horizontal length of transition zone 20 (dimension C of FIG. 2) should be from about 0.03 mm to about 0.20 mm, again with the angle ∝ of said transition zone 20 being between about 15° and about 40°. This requirement implies that the height b of the add zone 18 shown in FIG. 2 will be from about 0.015 mm to about 0.050 mm. These facts, when coupled with the fact that the diameter A of the near vision-aiding zone is between about 1.5 mm and about 3.5 mm, while dimension E of the far vision-aiding zone is from about 2.33 mm to about 3.33 mm, will provide high quality, bifocal correction. It also should be noted that the line forming the slope of transition zone 20 appears to be linear in FIGS. 2 and 4, but this surface may, in fact, be curved as indicated by curvature arrow D.

Having provided a soft contact lens, bifocal, correction, it remains only to hold applicant's lens in its proper position on the cornea. Again, this is best achieved in the hereindescribed lenses through use of two so-called "slab-off zones". Such a zone is preferably achieved by cutting a portion of the periphery of the anterior side of the lens 10 (see region 24 of FIG. 1, or regions 24' and 24" of FIG. 3 for illustration of the positioning of such zones). In some of the more preferred embodiments of applicant's lenses, these slab-off regions will generally have a more-or-less crescent shape such as that depicted by the cross-hatched region 24 of FIG. 1.

Figure 3:
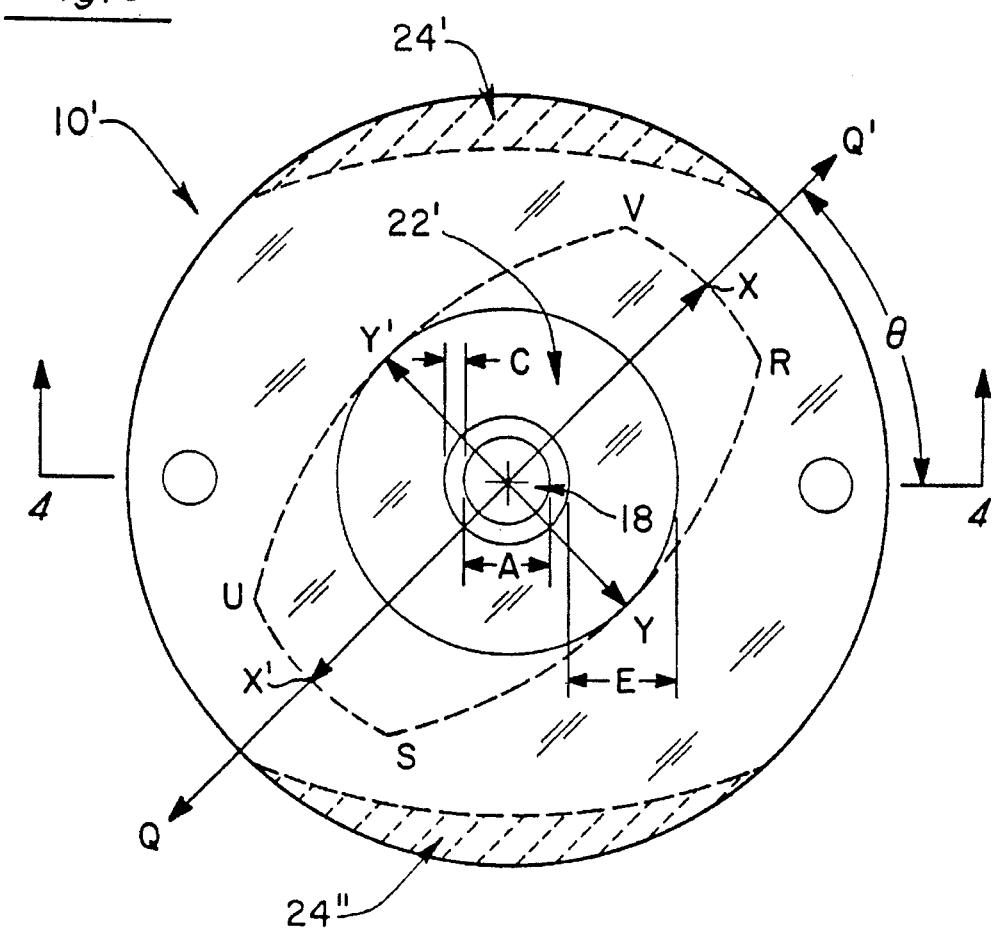
FIG. 3 is a top plan view of a second embodiment of the soft contact lens of this patent disclosure. In contrast to the lens shown in FIG. 1, it further comprises a toric optic zone cut in the posterior, eye-contacting surface of the lens.

FIG. 3, depicts a lens 10' generally having counterpart features and geometry to the lens 10 shown in FIG. 1. The lens 10' shown in FIG. 3 does, however, have some additional features. For example, lens 10' is shown provided with a second slab-off region 24" in its lower periphery. Preferably the resulting double slab-off system will have a slab-off region at a lowermost portion and at an uppermost portion of a correctly fitting lens i.e., one slab-off region will preferably be at about six o'clock and the other at about twelve o'clock as indicated in FIG. 3. Such slab-off regions should not however invade any region occupied by a anterior optical zone.

FIG. 3 also depicts, through use of dotted lines, the outline of a "toric" shaped, optical zone whose parimeter is indicated by letters U, V, R, S. The longer axis Q, Q' of this toric zone is shown oriented at an angle θ from the horizontal B–B' section line. This toric optical zone also is shown provided with a long meridian X, X', and a short meridian Y, Y', that are generally perpendicular to each other.

Figure 4:
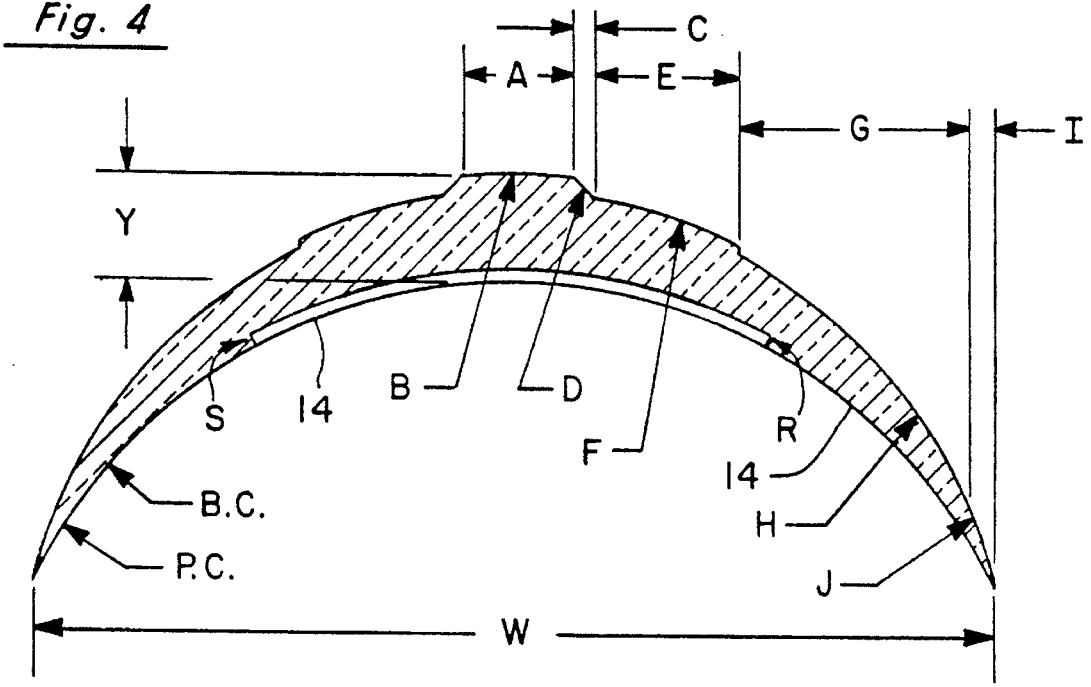
FIG. 4 is a cross-sectional view as seen along section line B—B of FIG. 3 of a lens having a toric optic zone.

FIG. 4, is a section view taken along line B'–B of FIG. 3. It depicts how the toric optical zone is cut into the concave, eye-contacting posterior surface 14 of the lens 10' to create a hollowed out, toric zone.

Empirical experimentation has demonstrated that the lenses of the present invention are especially suitable for soft contact lens requiring correction of a refractive error of +20.00 D to –20.00 D sphere, –0.5 D or less of refractive cylinder that does not interfere with visual activity for the spherical bifocal, or –0.75 D of refractive cylinder for a toric bifocal, and requiring a presbyopic correction of from about +0.50 D to about +6.00 D.

The following table depicts typical values for the alphabetical symbols given in FIG. 2.

|   | B.C./P.C. 8.30/9.25 | B.C./P.C. 8.60/9.55 | B.C./P.C. 8.90/9.85 |
| --- | --- | --- | --- |
| A | 2.00 | 2.00 | 2.00 |
| B | * Cal (6.50) | Cal (6.50) | Cal (6.50) |
| C | 0.07 | 0.07 | 0.07 |
| D | 6.98 | 6.98 | 6.98 |
| E | 3.08 | 3.08 | 3.08 |
| F | Cal (6.70) | Cal (6.70) | Cal (6.70) |
| G | 2.80 | 2.80 | 2.80 |
| H | REF. SECTION II | REF. SECTION II | REF. SECTION II |
| I | 0.30 | 0.30 | 0.30 |
| J | 7.75 | 7.83 | 7.89 |
| W | 14.50 | 14.50 | 14.50 |

* The notation "Cal" in the above table refers to a calculated dimension of curvature required to provide the correct refractive power of that zone, while the value given in the brackets ( ) after the Cal notion would represent a "typical" value for such a refractive power.

The soft, bifocal, contact lenses of this patent disclosure may be composed of compositions of a wide variety of hydrophilic lens materials known to this art that are capable of making hydrophilic lenses; these will include: (1) hydrophilic polymers of 2-hydroxyethyl methacrylate and especially those cross-linked with ethyleneglycol dimethacrylate, (2) hydroxyethyl methacrylate cross linked with other compounds such as diester molecules, (3) poly-n-vinyl pyrrolidone, (4) elthylene glycol dimethacrylate and methacrylic acid. The present invention contemplates use of any of the above compositions, but 2-hydroxyethyl methacrylate cross-linked with ethyleneglycol dimethacrylate is a particularly preferred construction material. It is sold under the trademark: Methafilcon A®.

Once an individual contact lens has been cut, machined and polished, it will then be hydrated in a sterile, buffered saline solution in ways known to the soft contact lens production arts. This swells the lens to an equilibrium state wherein a typical composition used to make the hereindescribed lenses will contain about 55 percent water. For example, a physiological saline solution (0.9% sodium chloride), can be buffered with an ophthamalogically acceptable buffer which will not interfere with the optical qualities of the lens so that the end product can be used as a lens swelling agent.

Representative examples of these materials and methods for their manufacture may be found in U.S. Pat. Nos. 2,979,578 and 3,220,960. The property which makes these materials particularly useful for making contact lenses is their ability to absorb water with a concomitant swelling to a soft mass having extremely good mechanical strength, complete transparency, and the ability to retain shape and dimensions. When equilibrated in a given fluid, such lenses can elastically recover their shape—even after deformations exceeding 100%.

Thus, while applicant's invention has been described with respect to various specific examples, and a spirit that is committed to the importance of the geometries of certain elements of these lenses, and their relative dimensions, it is to be understood that this invention is not limited thereto, but rather only should be limited by the scope of the following claims.

Thus having disclosed this invention, what is claimed is:

1. A soft contact lens comprising: an annular main body portion having a virtually continuous, concave, eye-contacting, posterior surface and a non-continuous, generally convex, anterior surface having a near vision-aiding add zone, a transition zone that is concentric with, and annularly surrounds, the near vision-aiding add zone, a far vision-aiding zone that is concentric with and annularly surrounds the transition zone and a slab-off system, and wherein: (a) the near vision-aiding add zone has a diameter of from about 1.5 mm to about 3.5 mm, (b) the transition zone has a base length of from about 0.03 mm to about 0.20 mm and (3) a slope angle of from about 15° to about 40°.

2. The lens of claim 1 further comprising a double slab-off system.

3. The lens of claim 1 wherein the lens construction material is 2-hydroxyethyl methacrylate cross linked with ethyleneglycol dimethacrylate.

4. A soft contact lens comprising: an annular, main body portion having a virtually continuous, concave, eye-contacting, posterior surface having a toric cut of prescribed orientation and a non-continuous, generally convex, anterior surface having a near vision-aiding add zone, a transition zone that is concentric with, and annularly surrounds, the near vision-aiding add zone, a far vision-aiding zone that is concentric with, and annularly, surrounds the transition zone and a slab-off system, and wherein: (a) the near vision-aiding add zone has a diameter of from about 1.50 mm to about 3.50 mm, (b) the transition zone has a base length of from about 0.03 mm to about 0.20 mm and (3) a slope angle of from about 15° to about 40°.

5. The lens of claim 4 further comprising a double slab-off system.

6. The lens of claim 4 wherein the lens construction, material is 2-hydroxyethyl methacrylate cross linked with ethyleneglycol dimethacrylate.

* * * * *